US 6,648,115 B2

(12) United States Patent
Smith et al.

(10) Patent No.: US 6,648,115 B2
(45) Date of Patent: Nov. 18, 2003

(54) METHOD FOR SLIP POWER MANAGEMENT OF A CONTROLLABLE VISCOUS FAN DRIVE (75) Inventors: Anthony L. Smith, Troy, MI (US); Patrick Benedict Usoro, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/977,560

(22) Filed: Oct. 15, 2001

(65) Prior Publication Data
US 2003/0079952 A1 May 1, 2003

(51) Int. Cl.[7] .................. F16D 35/02; F16D 35/00
(52) U.S. Cl. ............... 192/21.5; 192/58.61; 192/58.62; 192/58.63; 192/82 T
(58) Field of Search .................... 192/58.61, 58.6, 192/58.5, 58.2, 54.1, 103 R, 21.5, 58.62, 58.63, 82 T; 123/41.12

(56) References Cited

U.S. PATENT DOCUMENTS

| | | | | |
|---|---|---|---|---|
| 2,954,857 A | * | 10/1960 | Palm | 192/58.5 |
| 4,624,349 A | * | 11/1986 | Watanabe | 192/21.5 |
| 5,555,963 A | | 9/1996 | Martin | |
| 5,584,371 A | * | 12/1996 | Kelledes et al. | 192/58.61 |
| 5,667,715 A | | 9/1997 | Foister | |
| 5,679,091 A | * | 10/1997 | Salecker et al. | 477/86 |
| 5,722,523 A | | 3/1998 | Martin | |
| 5,823,912 A | * | 10/1998 | Fischer et al. | 477/97 |
| 5,896,964 A | * | 4/1999 | Johnston et al. | 192/21.5 |
| 5,960,918 A | | 10/1999 | Moser et al. | |
| 6,032,772 A | | 3/2000 | Moser et al. | |
| 6,079,536 A | * | 6/2000 | Hummel et al. | 192/103 R |
| 6,102,177 A | | 8/2000 | Moser et al. | |
| 6,149,832 A | | 11/2000 | Foister | |
| 6,173,823 B1 | | 1/2001 | Moser et al. | |
| 6,468,182 B1 | * | 10/2002 | Brandt et al. | 477/98 |

* cited by examiner

Primary Examiner—Rodney H. Bonck
(74) Attorney, Agent, or Firm—Kathryn A. Marra (57) ABSTRACT A method is disclosed for controlling the slip power of a viscous fluid fan drive clutch, especially of a cooling fan drive for an automotive vehicle. Data is prepared correlating slip power generation with clutch input and output speeds for the clutch and fan design. A maximum slip power for the operation of the cooling fan is specified by considering, for one, fan drive durability requirements. During operation of a computer based, fan speed control module, a desired fan drive speed is continually determined for the cooling requirements of the vehicle and the desired fan speed is compared, and adjusted, if appropriate, to avoid excessive slip power.

11 Claims, 5 Drawing Sheets

METHOD FOR SLIP POWER MANAGEMENT OF A CONTROLLABLE VISCOUS FAN DRIVE

TECHNICAL FIELD

This invention pertains to the electronic control of viscous fan drives such as those used in automotive cooling systems. More particularly, this invention relates to the control of viscous fan drives to manage slip power loss.

BACKGROUND OF THE INVENTION

Controllable viscous fluid clutches are being used in automotive engine cooling fan assemblies and additional applications are being developed. Control of torque transfer in the fan drive clutch means that, for example, fan speed can be controlled for more efficient vehicle operation and better cooling. The design and mode of operation of these controllable clutches take different forms. In general, the power input member of the clutch is driven by the engine or by an auxiliary power source. The output member drives the fan to draw cooling air through the heat exchange elements of the radiator, oil cooler and air conditioner condenser. A viscous fluid is used in these clutches to transfer torque from the power input member to the output member. In the operation of these devices, the power input member often rotates at a higher speed than the output member. The difference in their speeds is called slip or slippage. Slip represents a power loss in the fan drive clutch.

In one type of clutch, the electroviscous (EV) clutch, the control of torque transfer is achieved by controlling the amount of fluid, often a silicone oil, permitted to flow into the working chamber between the clutch members. In another type of controllable clutch a magnetorheological (MR) fluid is used and the control of torque transfer is managed by controlling the strength of a magnetic field in the fluid gap between the clutch input and output members. Clutches using MR fluids are particularly responsive to electronic control.

U.S. Pat. Nos. 5,960,918; 6,032,772; 6,102,177; and 6,173,823, each entitled "Viscous Clutch Assembly" describe clutches using magnetorheological fluids as the viscous medium between the power input and output members of the clutch. U.S. Pat. Nos. 5,555,963 entitled "Electromagnetically Controlled Hydraulic Clutch" and 5,722,523 entitled "Fluid Clutch" describe electroviscous clutches. The disclosures of these patents are incorporated by reference into this specification to illustrate the kinds of viscous fluid clutch devices that can be controlled by the practices of this invention.

U.S. Pat. Nos. 5,667,715 entitled "Magnetorheological Fluid" and 6,149,832 entitled "Stabilized Magnetorheological Fluid Compositions" describe viscous fluids for use in MR fluid clutches. As disclosed, they often contain finely divided iron particles suspended in a non-polar liquid. The suspended ferromagnetic particles have low magnetic coercivity. The fluids are formulated to resist particle separation even under high separation force applications and they typically function as Bingham fluids. In an ambient gravitational field, but in the absence of a magnetic field, they display a shear stress that increases generally linearly as the shear rate on the fluid is increased. When magnetorheological Bingham fluids are subjected to a magnetic field, the shear stress vs. shear rate relationship is increased so that substantially more shear stress is required to commence shear of the fluid. Thus, the shear stress and effective viscosity of the MR fluid can be instantly varied by controlled application of a magnetic field in the volume occupied by the fluid. This characteristic is very useful in controlling the transfer of torque between a rotor and stator in a viscous fluid clutch assembly.

The cooling fan is driven whenever the temperature of the engine coolant, the engine lubricating oil or the automatic transmission fluid reaches a predetermined temperature, or when the air conditioner high side pressure reaches a specified level. Temperature and pressure sensors are appropriately located for this purpose and their respective signals continually monitored by a computer based control module for the engine or powertrain. When cooling is required, the controller commands a voltage to be applied to the coil assembly of the clutch assembly. By control of the magnitude of the applied voltage, a suitable electromagnetic field is established in the clutch gap occupied by the fluid. The responding variation in the effective viscosity of the MR fluid is the basis for controlling fan speed.

Variation in the viscosity of the MR fluid permits slippage between the clutch rotor and stator members and the fan speed is controlled to efficiently and effectively cool the fluids used in operation and cooling of the car or truck. In fact, usage of controllable viscous fluid cooling fan drives, especially MR fluid fan drives, provide vehicle fuel economy improvement, noise reduction, powertrain cooling improvement and cost reduction. However, the slippage in the fan drive clutch does result in slip power generation and loss, which translates into clutch temperature increase. It is desirable to limit, if possible, the amount of slip power for several reasons, fan drive durability being one of them.

Accordingly, it is an object of this invention to provide a method of controlling the operation of controllable viscous fluid fan clutches to avoid high slip power. It is another object of this invention to provide such a method that can be conducted by the engine control module or equivalent fan control computer.

SUMMARY OF THE INVENTION

This invention is a method for controlling the operation of an electronically controlled viscous fan drive to avoid excessive slip power loss. In accordance with a preferred embodiment of the invention, the invention is applied in the control of a MR fluid cooling fan clutch for an automotive vehicle using an engine driven fan drive such as a pickup truck. But the invention is applicable to other controllable viscous fluid clutches such as EV clutches.

In the case of a vehicle, an engine driven cooling fan is used to draw ambient air through one or more heat exchangers to extract heat from fluids such as engine coolant, engine oil, automatic transmission fluid and air conditioner refrigerant. The cooling fan assembly includes a viscous fluid clutch in which the rotor is driven by the engine. The viscous fluid, preferably a MR fluid, serves to control the operation and speed of the clutch stator to which the fan is connected. A given fan design has known air moving capabilities depending upon its rotational speed resulting from the torque applied to drive it. In a MR fluid clutch an electromagnetic field generating coil is used to control the effective viscosity of the MR fluid and thus the torque driving the fan.

Many functions of modern automotive engines (and transmissions) are controlled electronically with an engine or powertrain control module. The heart of the module is a suitably programmed computer with its supporting clock, input/output devices, memories and the like. Such a control module is used to control cooling fan speed. During its processing cycles repeated many times per second the module monitors several vehicle operating parameters including engine coolant and oil temperatures and refrigerant pressure. It interprets these signals in accordance with predetermined data in its memory to regulate the speed of the cooling fan.

The difference between clutch input speed and fan speed translates into slip power loss which tends to increase the temperature of the fan drive assembly. This invention provides a process for control of fan clutch operation to maintain necessary cooling without experiencing excessive slip power loss and therefore excessive temperature rise which can lead to premature failure of the fan drive.

Slip power is determined for a given fan drive assembly as a function of the fan torque constant, fan speed and slip speed. Based on this analysis an excess slip power region is identified as a function of fan speed and input speed. In the control of fan speed by the controller computer, cooling is accomplished while managing fan speed to avoid, where possible, the excessive slip power region. In the MR fluid clutch, fan speed is controlled by variation of the magnetic field acting on the MR fluid to vary its shear stress and effective viscosity. In other controllable viscous fluid clutches, a different fluid parameter may be used to control fan speed and slip power. For example, in the EV clutch, the volume of the fluid in the working chamber of the clutch determines fan speed. The working volume of the silicone oil is controlled with an electrically actuated valve.

In general, a maximum slip power value is determined for a specific fan clutch drive to ensure its proper performance and durability. Given this pre-determined maximum slip power level, calculations based on fan drive input speed values and the torque constant of the fan or fan clutch drive yield a corresponding family of slip power control, fan speed values that define the boundary of an excessive slip power region. Such slip power control, fan speed values may be continually calculated by the fan drive controller for comparison with the current controller determined, desired fan drive speed. Alternatively, and preferably, a family of slip power control, fan speed values for the operating range of fan drive input speed values are pre-calculated and stored in the controller database for retrieval during its control cycles.

The fan drive controller then continually compares its desired fan speed, based on current cooling requirements, with the applicable slip power control, fan speed values. If these comparisons indicate that the desired fan speed will not cause the fan drive to operate in the excessive slip power region no correction is made. But if these comparisons indicate that the desired fan speed will cause the fan drive to operate in the excessive slip power region a correction to the desired fan speed may be made, provided engine cooling is not adversely affected, such that the fan drive will operate at or below the maximum slip power level. While it may be necessary to occasionally and temporarily exceed the pre-determined maximum slip power value to satisfy higher priority engine cooling requirements, the excessive slip power operating region can generally be avoided.

Other objects and advantages of the invention will become apparent from a detailed description of preferred embodiments which follows.

DESCRIPTION OF THE PREFERRED EMBODIMENTS

The development of MR fluid fan clutch drives offers many advantages for automotive vehicles. It provides a low cost and fuel efficient way of operating the fan to provide just the required amount of cooling. However, the slippage between the driving and driven members of the clutch represents a power loss and the loss is realized as heat mainly in the MR fluid. It is a purpose of this invention to provide a process for controlling the operation of the fan drive to avoid excessive slip power loss.

As described above, automotive control technology exists to continually sense the need for fan cooling during vehicle operation and to regulate the fan at the desired fan speed command, $\omega_{F,desired}$, to provide the cooling. This invention adds to the existing cooling control processes a process to modify the desired fan speed command, $\omega_{F,desired}$, under certain operating conditions such that the slip power dissipated by the fan drive rarely, if ever, exceeds a certain prescribed value, $P_{slip,max}$.

The slip power dissipated by the clutch is given by equation 1:

$$P_{slip} = T_{slip} \omega_{slip},$$

where $T_{slip}$ is the slip torque and $\omega_{slip}$ is the slip speed. The fan torque, $T_{fan}$, can approximate the slip torque since the bearing torque is relatively small, especially under conditions where slip power is high. The fan torque is given by equation 2:

$$T_{fan} \cong K_{fan} \omega_F^2$$

where $K_{fan}$ is the fan torque constant and $\omega_F$ is the fan speed. The value of the coefficient, $K_{fan}$, is determined for a given fan design. The slip speed is given by equation 3:

$$\omega_{slip} = \omega_I - \omega_F$$

where $\omega_I$ is the input speed and $\omega_F$ is the fan speed. Therefore, the slip power can be written, by combining the above equations, as equation 4:

$$P_{slip} \cong K_{fan} \omega_F^2 (\omega_I - \omega_F)$$

The slip power is a function of both the input speed, $\omega_I$, and fan speed, $\omega_F$. In this embodiment, the input speed is engine speed or a related speed depending upon gear or pulley ratio. Fan speed is detected by a suitable sensor, such as a Hall device sensor.

Figure 1:
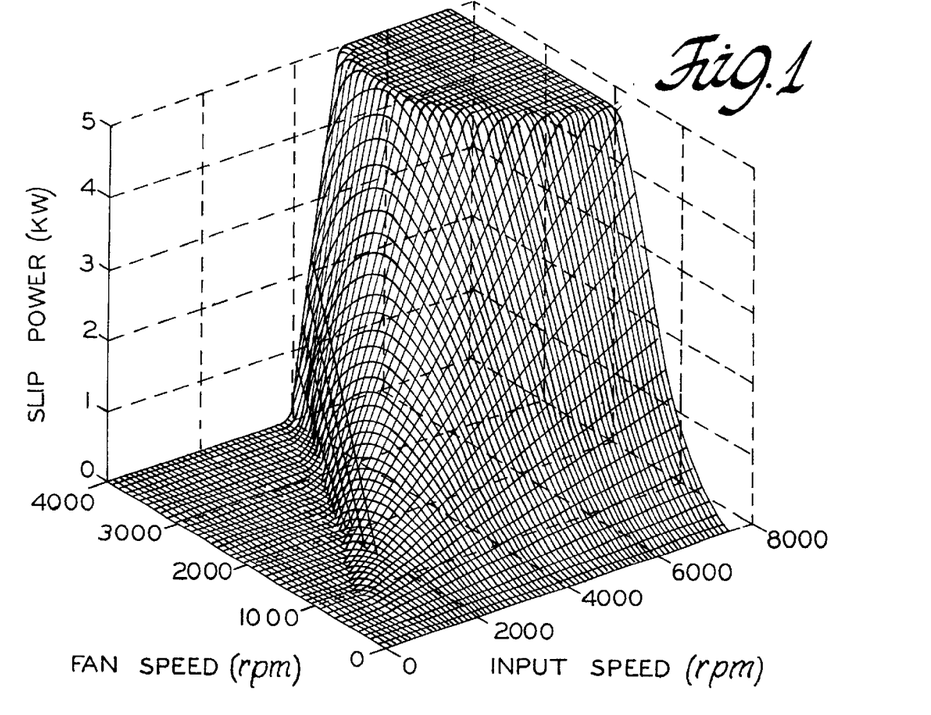
FIG. 1 is a graph in three dimensions correlating Input Speed (rpm), x-axis; Fan Speed (rpm), y-axis; and Slip Power (KW), z-axis for a pickup truck ring fan assembly.

The slip power surface for a given $K_{fan}$ is shown in FIG. 1. In this example, the fan is a cooling ring fan for a pickup truck. The value of its torque constant, $K_{fan}$, is set to be $0.2814 \times 10^{-3}$ Nms². The surface for slip power up to a value of, for example, five kilowatts was determined using the above slip power equation and plotted in FIG. 1. The surface of slip values in kW is seen as a function of input speed (rpm) and fan speed (rpm). In this specific MR fluid cooling fan drive it was decided that five kilowatts was the maximum slip power that was to be permitted in the operation of the drive. Obviously, in other applications of the invention a maximum slip power has to be determined for the fan design and application.

Figure 2:
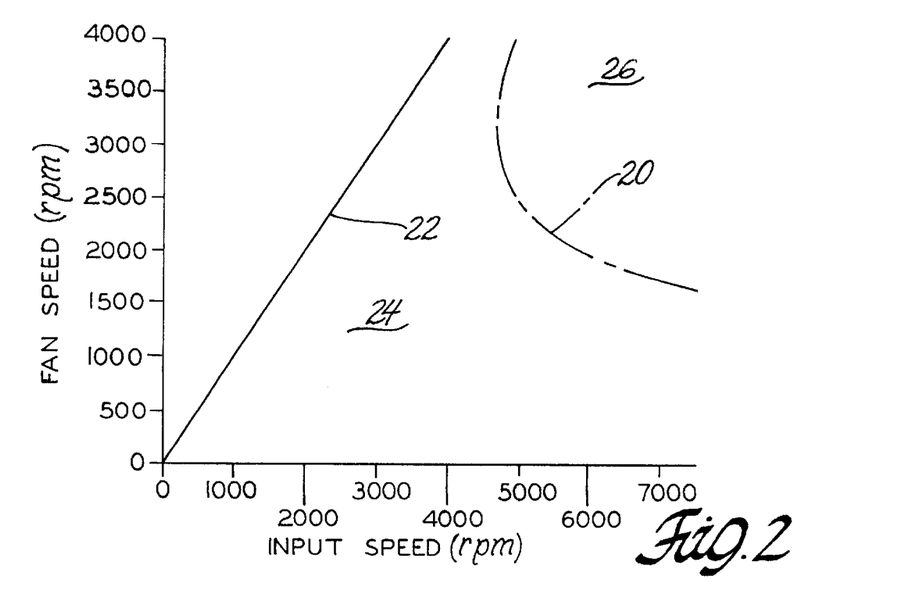
FIG. 2 is a graph in two dimensions correlating Input Speed (rpm), x-axis; and Fan Speed (rpm), y-axis at the slip power limit for the same pickup truck fan assembly.

Given a decision to control the fan of this example to avoid slip power generation in excess of 5 kW, the plane of FIG. 1 corresponding to that power value is shown as FIG. 2. Thus, FIG. 2 shows the excess slip power region versus input speed, $\omega_I$, and fan speed, $\omega_F$, when $P_{slip,max}$ has been set to 5 kW. Curve 20 of FIG. 2 defines a border (i.e., where slip power is exactly 5 kW) of the excess slip power region 26 for the fan drive, where slip power is greater than 5 kW. Curve 22 is the lockup line where fan speed is equal to input speed and the slip power is therefore equal to zero. Thus the goal of this process for avoiding excessive slip power is to control fan speed, $\omega_F$, to be in the region, 24, between the lockup line 22 (inclusive) and excessive power curve 20 (inclusive), where slip power is less than or equal to 5 kW.

Figure 3:
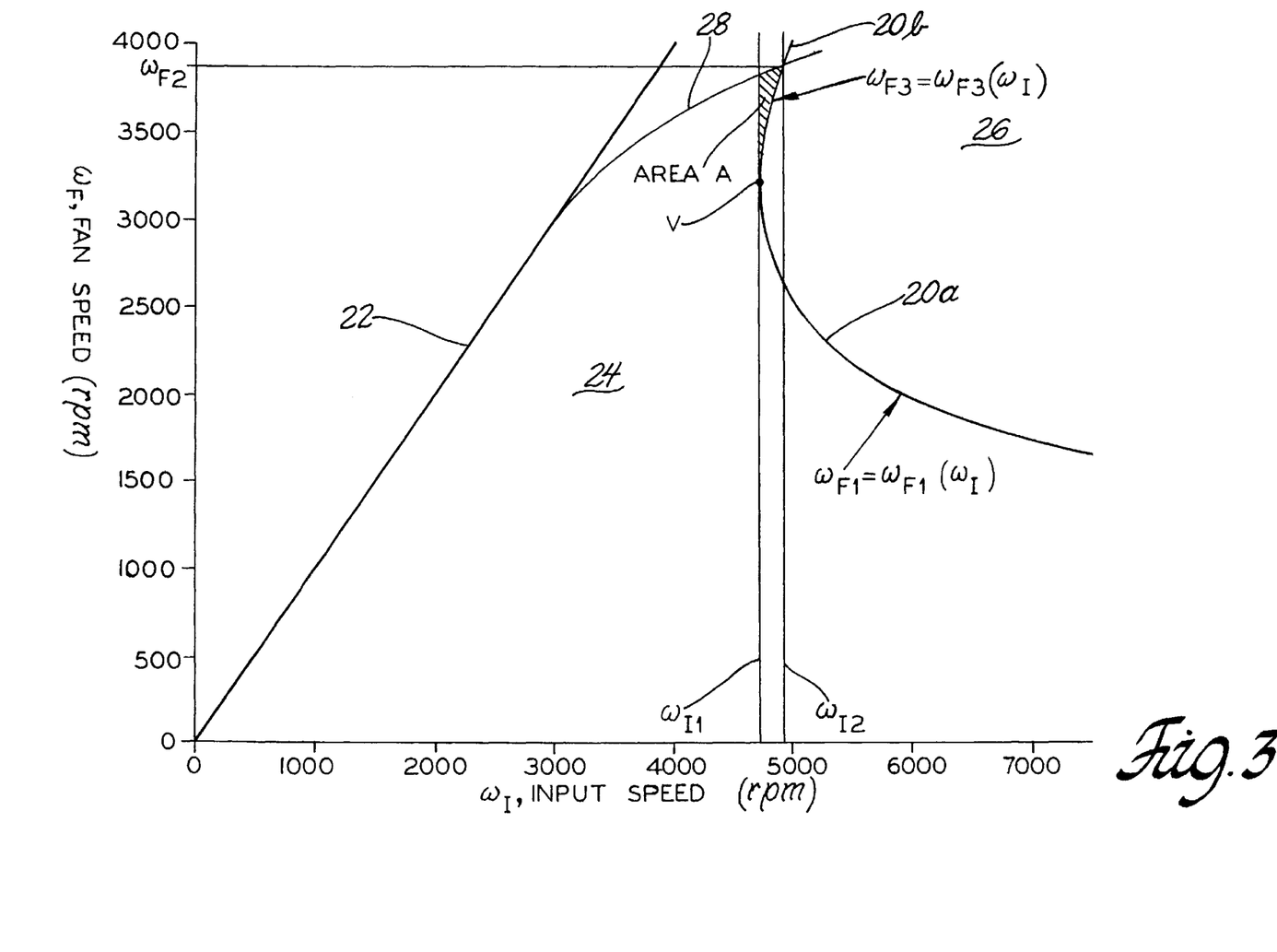
FIG. 3 is a graph of Input Speed vs. Fan Speed showing the same correlation as FIG. 2 with additional highlights related to the practice of this invention.

FIG. 3 is a curve like FIG. 2 with additional information to show how to derive an algorithm to prevent operation in the excess slip power region. Note that $\omega_{I1}$ is the value of $\omega_I$ at the vertex, V, of curve 20. Using equation 4 it can be shown that $$\omega_I = \omega_{II} = \frac{3}{2}\left(\frac{2P_{slip,max}}{K_{fan}}\right)^{\frac{1}{3}} \text{ and } \omega_F = \left(\frac{2P_{slip,max}}{K_{fan}}\right)^{\frac{1}{3}}$$

at the vertex, V, of curve 20. Note that the fan drive maximum speed curve 28 enters the excess slip power region 26 when $\omega_I=\omega_{I2}$ and $\omega_F=\omega_{F2}$. Note further that speed curve 28 is only one of many possible fan speed curves based on input speed. The drive does not necessarily operate in "lockup" mode. However, with respect to any such speed curve of this fan, if $\omega_I \leq \omega_{I1}$ then it is not possible to enter the excess slip power region 26 where the slip power is greater than 5 kW.

If the desired fan speed (as determined by the controller) enters the excess slip power region 26 when $\omega_{I1}<\omega_I<\omega_{I2}$ then it is possible to either increase $\omega_{F,desired}$ by setting $\omega_{F,desired}=\omega_{F3}(\omega_I)$ (curve 20b) or decrease $\omega_{F,desired}$ by setting $\omega_{F,desired}=\omega_{F1}(\omega_I)$ (curve 20a) to avoid operating the fan drive in the excess slip power region 26. These relationships are based on solving equation 4 for $\omega_{F,desired}$ after setting the slip power, $P_{slip}$, equal to $P_{slip,max}$, which, for this example, has been set to 5 kW. $\omega_{F1}(\omega_I)$ is curve 20a which is the solution for $\omega_F$ as a function of $\omega_I$ below the vertex, V, and $\omega_{F3}(\omega_I)$ is curve 20b which is the solution for $\omega_F$ as a function of $\omega_I$ above the vertex, V. In order to reduce fan noise it is desirable to set $\omega_{F,desired}=\omega_{F1}(\omega_I)$. Appropriate checks, such as observing engine coolant temperature, are made to ensure that this reduction in engine cooling does not compromise powertrain integrity. If reducing engine cooling is not possible then setting $\omega_{F,desired}=\omega_{F3}(\omega_I)$ will both limit slip power and increase engine cooling.

If $\omega_{F,desired}$ enters the excess slip power region when $\omega_I>\omega_{I2}$ then it is possible to decrease $\omega_{F,desired}$ by setting $\omega_{F,desired}=\omega_{F1}(\omega_I)$ (curve 20a) to avoid operating the fan drive in the excess slip power region 26. Again, appropriate checks, such as observing engine coolant temperature, are made to ensure that this reduction in engine cooling does not compromise powertrain integrity.

In processes described herein, values of fan speed defining the border of the excessive slip power region may be continually calculated from input speed and maximum slip power using equations specified above or their equivalents. Preferably, however, a family of limiting fan speed values for slip power control are pre-calculated for storage in the computer database. The controller then obtains the appropriate value based on input speed by a direct reading or by interpolation from the table.

Figure 4A:
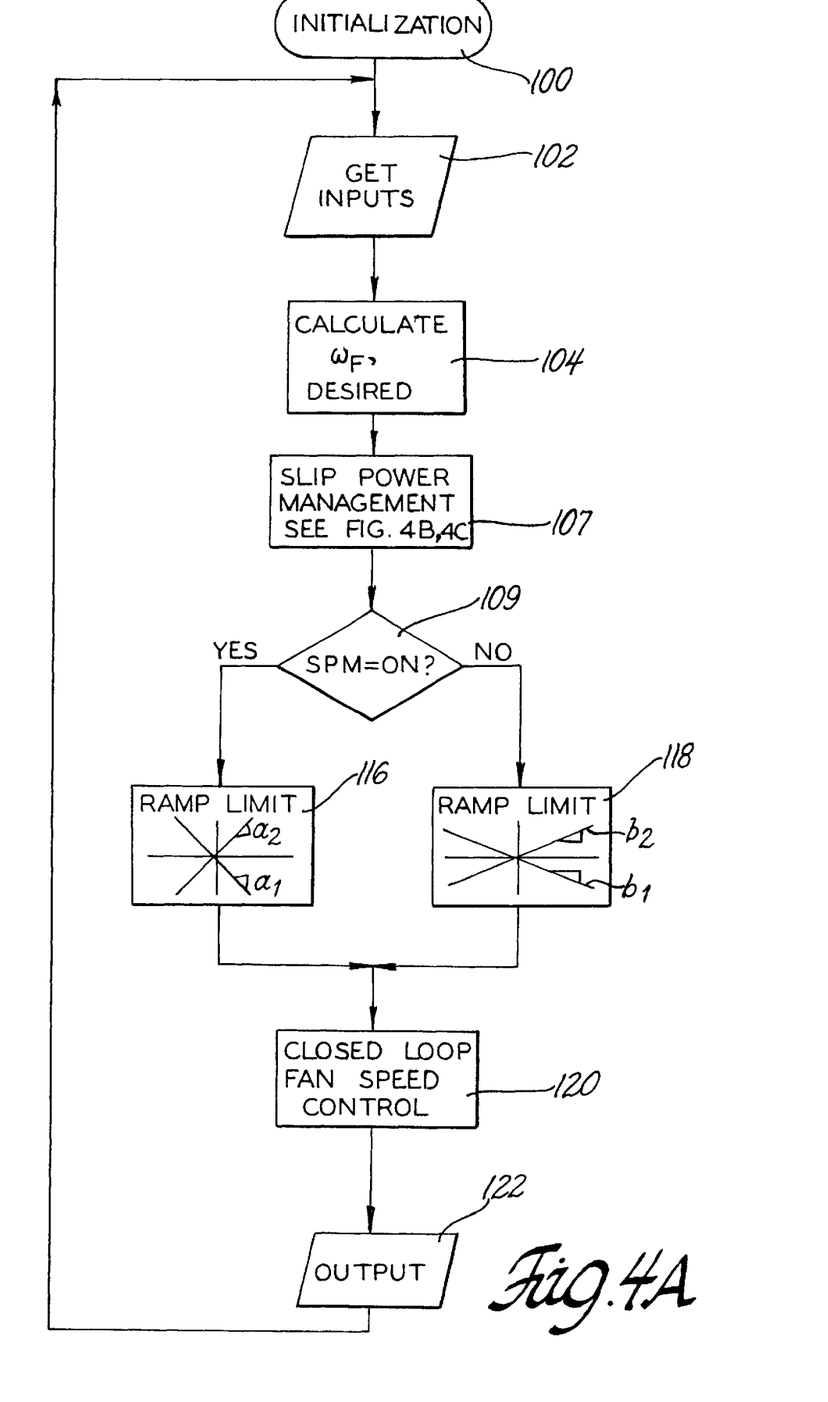
FIG. 4A is a process flow diagram of a fan control algorithm utilized in the practice of an embodiment of this invention.
Figure 4B:
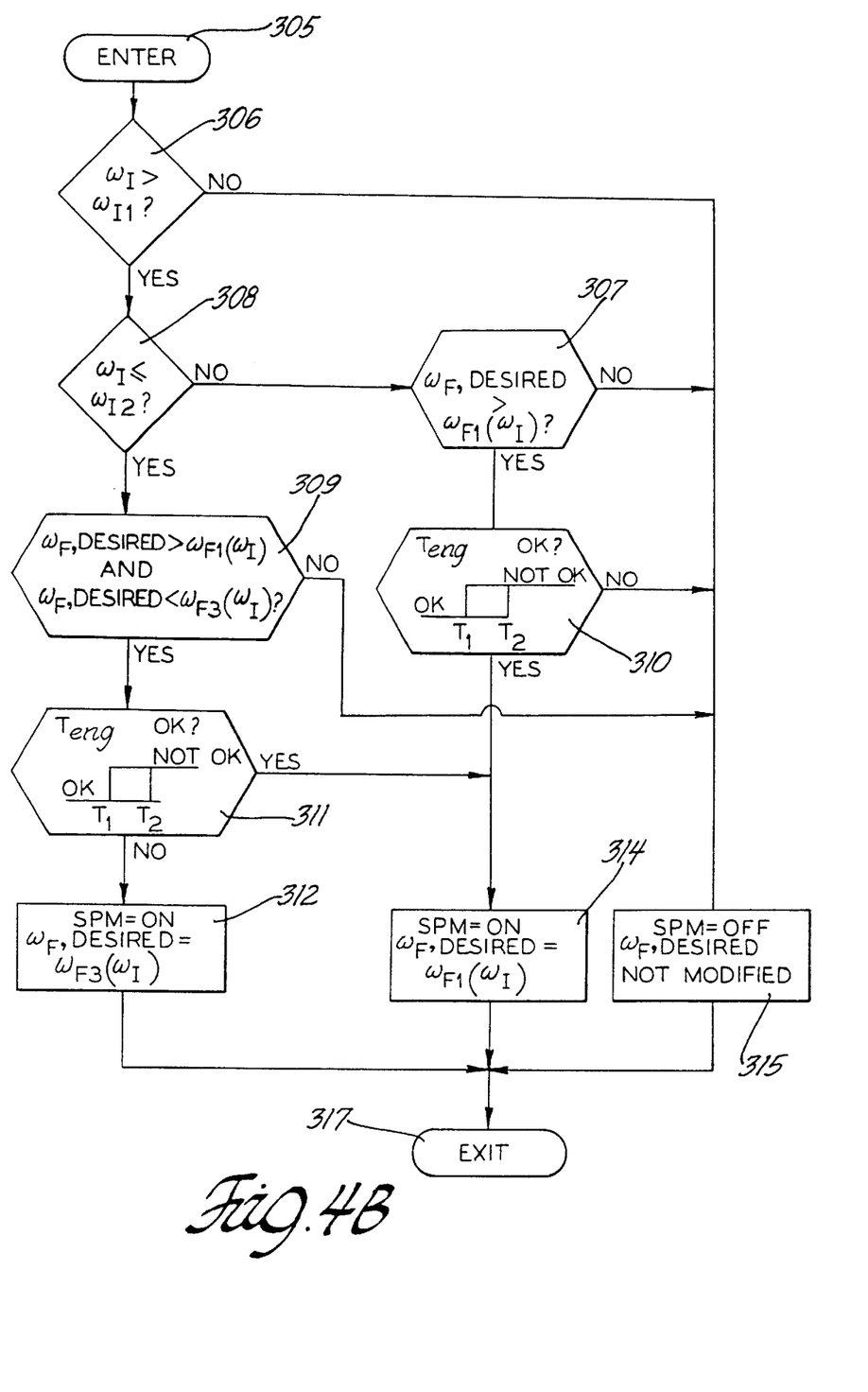
FIGS. 4B and 4C are process flow diagrams of slip power management algorithms used in the practice of embodiments of the invention.
Figure 4C:
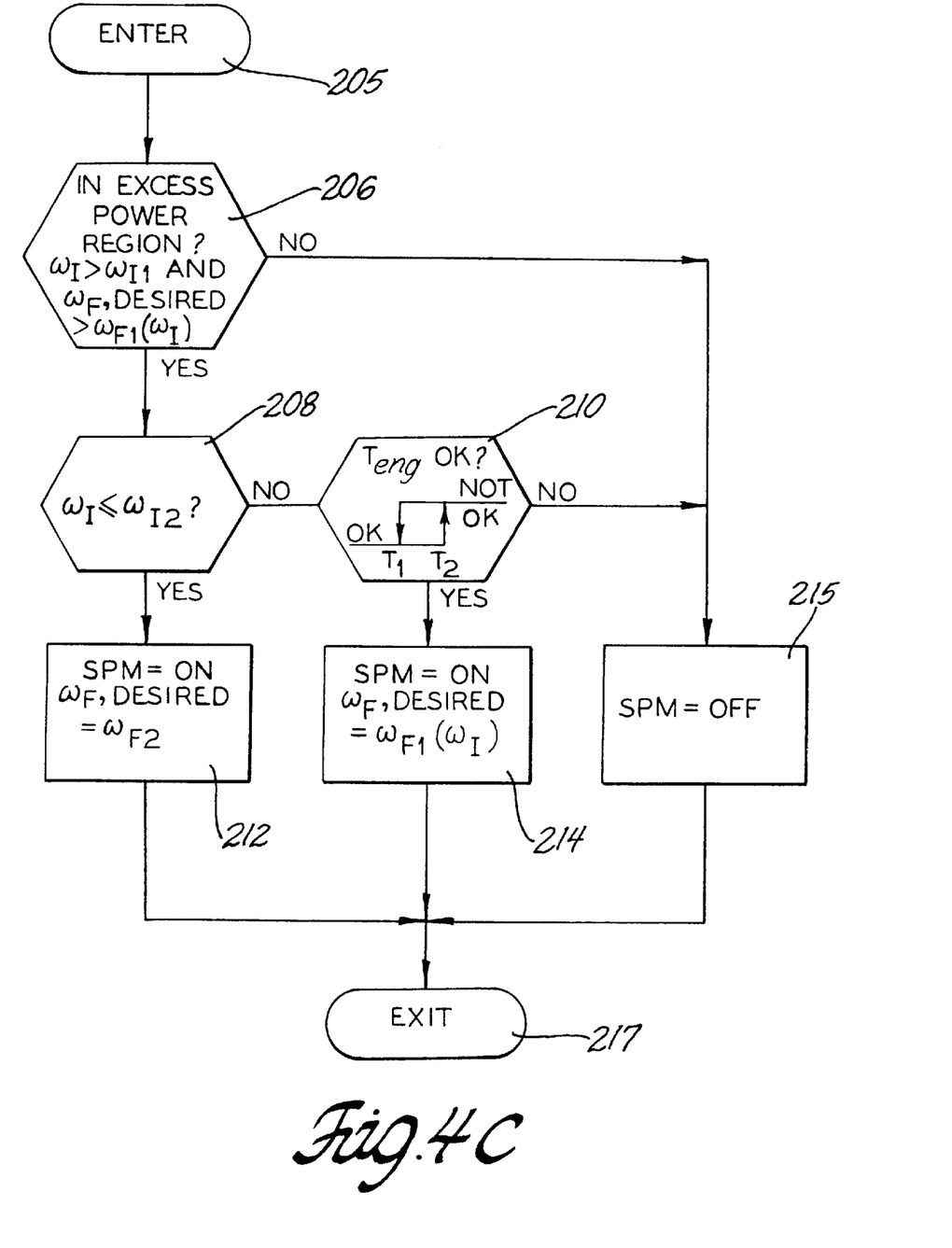

FIG. 4A is a process flowchart of a preferred embodiment of an overall cooling fan control algorithm incorporating the slip power management process of this invention. FIGS. 4B and 4C show flowcharts for implementing two embodiments of this slip power management algorithm into an overall cooling fan control algorithm.

Referring first to FIG. 4A, the block 100 designates a series of initialization instructions executed at the initiation of vehicle operation for appropriately setting the initial condition or state of the various terms referred to below. The process then proceeds to input block 102.

At block 102 the controller reads sensor inputs such as the engine coolant temperature, transmission oil temperature, and air conditioner discharge (head) pressure. Typically, an analog/digital channel is used to read the voltage on a temperature or pressure sensor. The computer may use a lookup table to convert the voltage to engineering units of temperature or pressure. The controller also reads the current actual fan speed, $\omega_F$, in rpm for later comparison with the new value of commanded fan speed to be determined in this controller cycle.

After reading the various sensor inputs at block 102, the process proceeds to block 104. The programmed controller calculates a desired fan speed, $\omega_{F,desired}$. An $\omega_{F,desired}$ is calculated for each of the temperature inputs and the pressure input using either a prescribed functional relationship and/or a table lookup which is monotonically increasing and piecewise linear. It is monotonically increasing because $\omega_{F,desired}$ increases or remains constant with increasing temperature or pressure. It is piecewise linear because it is implemented by table lookup and the computer does linear interpolation between the calibration values listed in the lookup table. The maximum value of these various $\omega_{F,desired}$ is then used as the output of block 104.

The process then undertakes the slip power management portion of the overall fan control process. The step is indicated as block 107 of FIG. 4A, but the illustration of slip power management is best understood with reference to FIG. 4B.

Referring to FIG. 4B, block 305 is a conceptual entry block for carrying the new value of $\omega_{F,desired}$ into the slip power management portion of the control process.

In block 306 the controller then checks to see if the input speed, $\omega_I$, could place the fan drive in the excess slip power region (such as is illustrated in FIGS. 2 and 3). The test query for this is:

$\omega_I>\omega_{I1}$?

If block 306 is false (the answer to the query is "no") then slip power management is not necessary. The newly determined value of $\omega_{F,desired}$ is acceptable. The process proceeds to block 315 where the Boolean state variable SPM is set equal to "OFF" and the desired fan speed, $\omega_{F,desired}$, is not modified. The process then exits FIG. 4B, block 317 and returns to FIG. 4A at block 109.

However, in block 306, if it is determined that the input speed, $\omega_I$, could place the fan drive in the excess slip power region (block 306 true) then the controller proceeds to block 308. Here it checks if $\omega_I \leq_{I2}$? This determines whether $\omega_{F,desired}$ can be increased or decreased (block 308 true) or solely decreased (block 308 false) to limit slip power.

If the response to the controller query in block 308 is false, then block 307 checks if $\omega_{F,desired}$ would place the fan drive in the excess slip power region 26. The test for this query is:

$$\omega_{F,desired} > \omega_{F1}(\omega_I)?$$

If block 307 is false then the newly determined value of $\omega_{F,desired}$ is acceptable. The process proceeds to block 315 where the Boolean state variable SPM is set equal to "OFF" and the desired fan speed, $\omega_{F,desired}$, is not modified. The process then exits FIG. 4B, block 317, and returns to FIG. 4A at block 109. If block 307 is true then $\omega_{F,desired}$ should be decreased to limit slip power. However, a reduction in fan speed is likely to reduce cooling. Since providing necessary cooling is the top priority of the fan, it is necessary to consider the present engine coolant temperature before reducing fan speed. The process moves to block 310 for this purpose.

In block 310 the controller checks to make sure engine coolant temperature, $T_{eng}$, is low enough to execute slip power management. The block uses the hysteretic pair, $T_1$, $T_2$. The engine coolant temperature must be low enough so that engine overheating due to reducing fan speed is not a concern. The following is the algorithm for this block:

---

If EngineTemp = OK then
    If $T_{eng} > T_2$ then
        EngineTemp = NOT_OK
Else
    If $T_{eng} < T_1$ then
        EngineTemp = OK

---

Here, EngineTemp is a Boolean state variable that records the current state of engine coolant temperature (OK, NOT_OK). During vehicle and engine operation the control module, including the fan control function, tracks engine coolant temperature. EngineTemp is initialized to OK. As long as engine coolant temperature stays below $T_2$ then EngineTemp remains equal to OK and it is all right to reduce fan speed to limit slip power. However, if engine coolant temperature exceeds $T_2$ then EngineTemp would be set equal to NOT_OK and reducing fan speed to limit slip power would not be allowed.

EngineTemp would remain equal to NOT_OK until the engine coolant temperature cooled back down to below $T_1$; at that point EngineTemp would be set equal to OK again. The main purpose of the hysteresis pair (as opposed to using just one temperature to determine if EngineTemp is OK) is to "debounce" the algorithm and prevent going in and out of allowing fan speed reduction for limiting slip power due to noise on the engine coolant temperature sensor.

Accordingly, if block 310 is true, it is safe to lower the desired fan speed to limit slip power without compromising powertrain integrity and EngineTemp is set equal to OK. Block 314 then sets SPM equal to "ON" and sets $\omega_{F,desired} = \omega_{F1}(\omega_I)$. For example, equation 4 is solved for $\omega_F$ given $P_{slip,max}$ and $\omega_I$ or a linear interpolation of a table of values representing a piece-wise linear approximation of $\omega_{F1}(\omega_I)$ is suitable.

If block 310 is false then slip power management is disallowed and EngineTemp is set equal to NOT_OK. The desired fan speed, $\omega_{F,desired}$, is not modified and SPM is set equal to "OFF", block 315. The process then exits FIG. 4B, block 317 and returns to FIG. 4A at block 109.

If the response to the controller query in block 308 is true the process proceeds to block 309 to check if the newly determined $\omega_{F,desired}$ would cause the fan drive to operate in the excess slip power region 26. The test queries for this are:

$$\omega_{F,desired} > \omega_{F1}(\omega_I)? \text{ and } \omega_{F,desired} < \omega_{F3}(\omega_I)?$$

If block 309 is false (the answer to either query is "no"), the process proceeds to block 315 where the SPM is set equal to "OFF" and the desired fan speed, $\omega_{F,desired}$, is not modified. The process then exits FIG. 4B, block 317 and returns to FIG. 4A at block 109. If block 309 is true (the answer to both queries is "yes") the process proceeds to block 311 where the controller checks to make sure engine coolant temperature, $t_{eng}$, is low enough to reduce $\omega_{F,desired}$ to prevent entering the excess slip power region 26.

Block 311 works in exactly the same manner as block 310 and accesses the same variables. If block 311 is false then we must limit slip power by increasing cooling. The process proceeds to block 312 where it sets SPM equal to "ON" and sets $\omega_{F,desired} = \omega_{F3}(\omega_I)$. For example, equation 4 is solved for $\omega_F$ given $P_{slip,max}$ and $\omega_I$ or a linear interpolation of a table of values representing a piece-wise linear approximation of $\omega_{F3}(\omega_I)$ is suitable. This will make the fan drive operate along curve 20b to maintain slip power at 5 kW. If block 311 is true then it is safe to lower the desired fan speed to limit slip power without compromising powertrain integrity and the process moves to block 314 which sets $\omega_{F,desired} = \omega_{F1}(\omega_I)$ and SPM equal to "ON" as previously discussed.

Blocks 312 and 314, either of which, when entered, modifies the desired fan speed command to limit slip power. Following stepping through either of these process boxes, the process leaves FIG. 4B through block 317 and returns to FIG. 4A at block 109. Since for this path SPM is set equal to "ON", either of block 312 or 314 passes their result through block 109 to block 116 which limits the maximum rate at which the fan speed is allowed to change when slip power management is active to $a_1$ rpm/sec when decreasing fan speed and $a_2$ rpm/sec when increasing fan speed.

The commanded fan speed, $\omega_{F,commanded}$, ramping process is executed in box 116. Thus, if $\omega_{F,desired} > \omega_{F,commanded}$ then $\omega_{F,commanded}$ is ramped up at a rate of $a_2$ rpm per second until $\omega_{F,desired}$ is reached. If $\omega_{F,desired} < \omega_{F,commanded}$ then $\omega_{F,commanded}$ is ramped down at a rate of $a_1$ rpm per second until $\omega_{F,desired}$ is reached. Block 116 is executed if slip power management is on; typically the ramp rates are faster here than in block 118 because you want to be able to quickly move the commanded fan speed out of the excess slip power region.

If block 109 is false then slip power management is not executed. The unmodified desired fan speed command is passed to block 118 which limits the maximum rate at which the fan speed is allowed to change when slip power management is inactive to $b_1$ rpm/sec when decreasing fan speed and $b_2$ rpm/sec when increasing fan speed.

Again, the commanded fan speed ramping process for this process path is executed in block 118. Thus, if $\omega_{F,desired} > \omega_{F,commanded}$ then $\omega_{F,commanded}$ is ramped up at a rate of b2 rpm per second until $\omega_{F,desired}$ is reached. If $\omega_{F,desired} < \omega_{F,commanded}$ then $\omega_{F,commanded}$ is ramped down at a rate of $b_1$ rpm per second until $\omega_{F,desired}$ is reached. $\omega_{F,commanded}$ is not explicitly shown, it is the output of blocks 116 and 118 which is the input to block 120. Block 118 is executed if slip power management is off; typically the ramp rates are slower here than in block 116 because it is preferred to slowly change fan speed for customer satisfaction.

The output of blocks 116 and 118 is the fan speed command, $\omega_{F,commanded}$ which is the input for block 120, the closed-loop fan speed control algorithm. The block 120 calculates an appropriate control signal to output to the fan drive in block 122 to maintain an acceptable fan speed profile.

Closed loop control of the fan speed is performed in block 120 using $\omega_{F,commanded}$ as the input command. The fan speed error, $\omega_{F,commanded}-\omega_F$, is a feedback variable for the closed loop controller in process block 120. Any of a number of closed loop control algorithms known to those skilled in the art can be implemented in this block. The output of this process is an actuator command (for example, current or voltage command) which is the input to block 122.

Depending on which clutch technology this algorithm is controlling (EV, MR fluid, other) block 122 will take the output of block 120 and use appropriate hardware to impose a voltage, cause a current, etc. in the controllable clutch in order to control the fan speed.

Another embodiment of a slip power management algorithm is shown in FIG. 4C. It is simpler and easier to implement while still providing the bulk of the advantages of the algorithm shown in FIG. 4B. The primary differences are that:

The check for whether $\omega_{F,desired}$ will place the fan drive in the excessive slip power region 26 includes consideration of a small operating area (see Area A in FIG. 3) where the slip power is not excessive, and If $\omega_{F,desired}$ will place the fan drive in the excessive slip power region 26 and $\omega_I < \omega_{I2}$ then $\omega_{F,desired}$ is increased to a known constant fan speed, $\omega_{F2}$, that will make the fan drive operate along the maximum speed curve to maintain slip power at or below $P_{slip,max}$.

Referring to FIG. 4C, block 205 is a conceptual entry block for carrying the new value of $\omega_{F,desired}$ into the slip power management portion of the control process.

In block 206 the controller then checks to see if the desired fan speed would place the fan drive in the excess slip power region (such as is illustrated in FIGS. 2 and 3). The test queries for this are $\omega_I > \omega_{I1}$? and $\omega_{F,desired} < \omega_{F1}(\omega_I)$?

In the case of this fan and its slip power curve, these queries include consideration of a small operating area (see Area A in FIG. 3) where the slip power is not excessive. But this check is computationally simpler to implement than the check performed in FIG. 4B, block 309 which would exclude that small operating area. However, in some instances, for example, a different $K_{fan}$, this check may include a larger valid operating Area A and the algorithm of FIG. 4B may be more desirable. If block 206 is false (the answer to either query is "no") then slip power management is not necessary. The newly determined value of $\omega_{F,desired}$ is acceptable. The process proceeds to block 215 where the Boolean state variable SPM is set equal to "OFF". The process then exits FIG. 4B, block 217 and returns to FIG. 4A at block 109.

However, if in block 206, it is determined that the desired fan speed operating point, $\omega_{F,desired}$, is in the excess slip power region then the controller proceeds to block 208. Here it checks if $\omega_I < \omega_{I2}$? This determines whether $\omega_{F,desired}$ needs to be increased (block 208 true) or decreased (block 208 false) to limit slip power. If block 208 is true then the process proceeds to block 212 where it sets SPM equal to "ON" and sets $\omega_{F,desired} = \omega_{F2}$. This will make the fan drive operate along the maximum speed curve to maintain slip power at or below 5 kW.

If the response to the controller query in block 208 is false, then $\omega_{F,desired}$ can only be decreased. However, a reduction in fan speed is likely to reduce cooling. Since providing necessary cooling is the top priority of the fan, it is necessary to consider the present engine coolant temperature before reducing fan speed. The process moves to block 210 for this purpose.

Block 210 works in exactly the same manner as discussed for block 310, FIG. 4B. Accordingly, if block 210 is true, it is safe to lower the desired fan speed to limit slip power without compromising powertrain integrity and block 214 sets $\omega_{F,desired} = \omega_{F1}(\omega_I)$ in the same manner as discussed for block 314, FIG. 4B and SPM is set equal to "ON".

If block 210 is false then slip power management is disallowed. The desired fan speed, $\omega_{F,desired}$, is not modified and SPM is set equal to "OFF", block 215. The process then exits FIG. 4B, block 217 and returns to FIG. 4A at block 109.

Blocks 212 and 214, either of which, when entered, modifies the desired fan speed command to limit slip power. Following stepping through either of these process boxes, the process leaves FIG. 4B through block 217 and returns to FIG. 4A at block 109.

Transients that cause the unmodified $\omega_{F,desired}$ to enter the excess slip power region are usually short lived. The most common transient is a downshift to grade a hill, which increases $\omega_I$, when the fan controller is specifying a value of $\omega_{F,commanded}$ large enough to cause the excess slip power region 26 to be entered. If slip power management is allowed, then $\omega_{F,desired}$ is modified such that $\omega_{F,commanded}$ will be ramped out of the excess slip power region 26 quickly.

Thus, this invention comprises determining a maximum slip power for a fan and viscous fluid fan drive design. Fan drive input and desired fan speed data correlations are developed that will not exceed the specified maximum slip power. This data is provided in a suitable useful form to the fan drive controller and is used by the controller to minimize the generation of excessive slip power in the fan drive. Such excess slip power may be avoided by increasing or decreasing commanded fan speed depending upon the fan drive speed/power relationships. Preferably care is taken in the process to not reduce fan speed when immediate engine cooling is necessary.

The process of this invention has been described in the context of managing slip power in a MR fluid fan drive but the process is applicable to any controllable viscous fluid fan clutch. The difference between the control of fan speed from one clutch design to another lies mainly in electronic control of some parameter of the viscous fluid. In the MR fluid fan drive, fan speed is controlled by the voltage applied to a coil for generating the magnetic field acting on the fluid. In an EV clutch, fan speed is controlled by managing oil flow between a fluid storage chamber for the clutch and the clutch's fluid working chamber. This flow is controlled by a solenoid operated control valve. Thus any change in fan speed determined by the process of this invention is executed by a signal to the solenoid in the EV fan drive.

While the invention has been described in terms of certain preferred embodiments, it is apparent that other practices could readily be adapted by one skilled in the art. Accordingly, the scope of the invention is to be considered limited only by the following claims.

What is claimed is:

1. A method of controlling slip power generation in a cooling fan clutch drive in an automotive vehicle, said fan clutch drive comprising a rotating input member and a rotatable fan stator member separated by a gap filled with a viscous fluid, said fluid serving to transmit torque between said input member and said fan stator member such that the rotational speed of said fan stator member is a function of the viscosity of said fluid, and the viscosity of said fluid is controlled through application of a magnetic field to said fluid by command of a programmed controller; said method comprising:

pre-determining a maximum slip power level for operation of said fan clutch drive;

determining a mathematical relationship using, in graphical form, orthogonal x-y coordinates between the rotational speed of said fan stator member, $\omega_F$, (y-axis) and the rotational speed of said rotating input member, $\omega_I$, (x-axis) at said pre-determined maximum slip power level, said mathematical relationship comprising, in graphical form, a curved linear path defining a border between an operating region of $\omega_I$ and $\omega_F$ values below said maximum slip power level and an operation region of $\omega_I$ and $\omega_F$ values above said pre-determined maximum slip power level, said curved linear path having a vertex at input member speed $\omega_{I1}$ with all operating values of $\omega_F$ at $\omega_I$ less than $\omega_{I1}$ lying below said pre-determined maximum slip power level, said curved linear path having a first border portion at $\omega_I$ values greater than $\omega_{I1}$ where corresponding $\omega_{F1}(\omega_I)$ values are at a lower border of $\omega_F$ values in said maximum slip power level and a second border portion at $\omega_I$ values greater than $\omega_{I1}$ where corresponding $\omega_{F3}(\omega_I)$ values are at an upper border of $\omega_F$ values in said maximum slip power level, and said fan stator member having a maximum speed curve intersecting said curved linear path at a stator member fan speed, $\omega_{F2}$, and a rotating input member speed $\omega_{I2} > \omega_{I1}$;

said controller thereafter continually determining a current stator member slip power control rotational speed value using said mathematical relationship for keeping current slip power below said predetermined maximum slip power level as a function of current input member rotational speed, the torque constant of said fan clutch drive, and said maximum slip power level, and said controller continually controlling said stator rotational speed, through control of said magnetic field, consistent with said current slip power control rotational speed value and the cooling requirements of said fan so as to minimize slip power excursions above said maximum slip power level.

2. A method of controlling slip power generation in a fan clutch drive as recited in claim 1 comprising on a continual basis using said controller to determine a current desired stator rotational speed, $\omega_{F\ desired}$, for the operation of said cooling fan clutch drive, comparing said desired stator rotational speed with said current stator slip power control rotational speed value and, if necessary, changing said current desired stator rotational speed to a speed value consistent with said current stator slip power control rotational speed value.

3. A method as recited in claim 1 or 2 comprising determining whether the engine coolant temperature permits a current reduction in fan speed before changing said desired stator rotational speed by reducing it.

4. A method of controlling slip power generation in a cooling fan clutch drive in an automotive vehicle, said fan clutch drive comprising a rotating input member and a rotatable fan stator member separated by a gap filled with a magnetorheological viscous fluid, said fluid serving to transmit torque between said input member and said fan stator member such that the rotational speed of said fan stator member is a function of the viscosity of said fluid, and the viscosity of said fluid being controlled through application of a magnetic field to said fluid by command of a programmed controller; said method comprising:

pre-determining a mathematical relationship using, in graphical form, orthogonal x-y coordinates between the rotational speed of said fan stator member, $\omega_F$, (y-axis) and the rotational speed of said rotating input member, $\omega_I$, (x-axis) at a pre-determined maximum slip power level for operation of said fan clutch drive, said mathematical relationship, in graphical form, comprising a curved linear path defining a border between an operating region of $\omega_I$ and $\omega_F$ values below said maximum slip power level and an operation region of $\omega_I$ and $\omega_F$ values above said pre-determined maximum slip power level, said curved linear path having a vertex at input member speed $\omega_{I1}$ with all operating values of $\omega_F$ at $\omega_I$ less than $\omega_{I1}$ lying below said pre-determined maximum slip power level, said curved linear path having a first border portion at $\omega_I$ values greater than $\omega_{I1}$ where corresponding $\omega_{F1}(\omega_I)$ values are at a lower border of $\omega_F$ values in said maximum slip power level and a second border portion at $\omega_I$ values greater than $\omega_{F1}$ where corresponding $\omega_{F3}(\omega_I)$ values are at an upper border of $\omega_F$ values in said maximum slip power level, and said fan stator member having a maximum speed curve intersecting said curved linear path at a stator member fan speed, $\omega_{F2}$, and a rotating input member speed, $\omega_{I2} > \omega_{I1}$;

said programmed controller determining a desired rotational speed of said fan stator member, $\omega_{F\ desired}$ at a current speed of said rotating input member, $\omega_I$; and, before changing said current speed, said programmed controller comparing said current speed, $\omega_I$, of said rotating input member with $\omega_{I1}$ or $\omega_{I2}$ as provided in sub-steps (a)–(c); and (a) if $\omega_I < \omega_{I1}$, then changing the current rotational speed of said stator member to $\omega_{F\ desired}$, or (b) if $\omega_{I1} < \omega_I <= \omega HI2$, then determining whether $\omega_{F1}(\omega_I) < \omega_{desired} < \omega_{F3}(\omega_I)$ and, if so, adjusting $\omega_{F\ desired}$ to either $\omega_{F1}(\omega_I)$ or $\omega_{F3}(\omega_I)$ to operate at or below said pre-determined maximum slip power level, or (c) if $\omega_I > \omega_{I2}$, then determining whether $\omega_{F\ desired}$ is within said pre-determined maximum slip power level and, if so, adjusting $\omega_{F\ desired}$ to $\omega_{F1}(\omega_I)$ to operate at or below said pre-determined maximum slip power level.

5. A method of controlling slip power generation as recited in claim 4 which sub-step (b) of said comparing step comprises:

(b) if $\omega_{F1}(\omega_I) < \omega_{F\ desired}$, then adjusting $\omega_{F\ desired}$ to either $\omega_{F1}(\omega_I)$ or $\omega_{F2}$ to operate at or below said pre-determined maximum slip power level.

6. A method of controlling slip power generation as recited in claim 5 comprising, before any reduction in a determined value of $\omega_{F\ desired}$ is commanded to operate said cooling fan clutch drive at or below said pre-determined maximum slip power level;

checking engine coolant temperature against a hysteresis pair of pre-determined engine coolant temperature values as a test of whether $\omega_{F\ desired}$ can be reduced and, if $\omega_{F\ desired}$ cannot be reduced increasing $\omega_{F\ desired}$ to $\omega_{F2}$ to minimize slip power if $\omega_{I1} < \omega_I <= \omega_{I2}$ and if $\omega_I > \omega_{I2}$ then maintain said determined value of $\omega_{F\ desired}$.

7. A method of controlling slip power generation as recited in claim 6 comprising controlling any increase or decrease in rotational speed of said rotatable fan stator member from (i) a current speed to a determined desired rotational speed by a first pair of pre-determined ramp rates for increasing or decreasing said current speed or from (ii) a current speed to an adjusted desired speed for operation at or below said maximum slip power level at a second pair of predetermined ramp rates for increasing or decreasing said current speed, said second pair of rates being equal to or greater than said first pair of rates.

8. A method of controlling slip power generation as recited in claim 5 comprising controlling any increase or decrease in rotational speed of said rotatable fan stator member from (i) a current speed to a determined desired rotational speed by a first pair of pre-determined ramp rates for increasing or decreasing said current speed or from (ii) a current speed to an adjusted desired speed for operation at or below said maximum slip power level at a second pair of predetermined ramp rates for increasing or decreasing said current speed, said second pair of rates being equal to or greater than said first pair of rates.

9. A method of controlling slip power generation as recited in claim 4 comprising, before any reduction in a determined value of $\omega_{F\ desired}$ is commanded to operate said cooling fan clutch drive at or below said pre-determined maximum slip power level;

checking engine coolant temperature against a hysteresis pair of pre-determined engine coolant temperature values as a test of whether $\omega_F$ desired can be reduced and, if $\omega_{F\ desired}$ cannot be reduced increasing $\omega_{F\ desired}$ to $\omega_{F3}$ ($\omega_I$) to minimize slip power if $\omega_{I1} < \omega_I <= \omega_{I2}$ and if $\omega_I > \omega_{I2}$ maintain said determined valve of $\omega_{F\ desired}$.

10. A method of controlling slip power generation as recited in claim 9 comprising controlling any increase or decrease in rotational speed of said rotatable fan stator member from (i) a current speed to a determined desired rotational speed by a first pair of pre-determined ramp rates for increasing or decreasing said current speed or from (ii) a current speed to an adjusted desired speed for operation at or below said maximum slip power level at a second pair of predetermined ramp rates for increasing or decreasing said current speed, said second pair of rates being equal to or greater than said first pair of rates.

11. A method of controlling slip power generation as recited in claim 4 comprising controlling any increase or decrease in rotational speed of said rotatable fan stator member from (i) a current speed to a determined desired rotational speed by a first pair of pre-determined ramp rates for increasing or decreasing said current speed or from (ii) a current speed to an adjusted desired speed for operation at or below said maximum slip power level at a second pair of predetermined ramp rates for increasing or decreasing said current speed, said second pair of rates being equal to or greater than said first pair of rates.

* * * * *